United States Patent Office 3,007,892
Patented Nov. 7, 1961

3,007,892
PIGMENTED POLYETHYLENE TEREPHTHA-
LATES AND PROCESS FOR PREPARING THEM
Hans Gruschke, Bad Soden (Taunus), Heinz Medem,
Offenbach (Main), and Karl Heinrich Grunewald and
Helmut Gerstenberg, Frankfurt am Main, Germany,
assignors to Farbwerke Hoechst Aktiengesellschaft
vormals Meister Lucius & Bruning, Frankfurt am Main,
Germany, a corporation of Germany
No Drawing. Filed Dec. 23, 1958, Ser. No. 782,373
Claims priority, application Germany May 16, 1958
16 Claims. (Cl. 260—40)

The subject matter of patent application Serial No. 782,368, filed December 23, 1958, relates to the manufacture of linear polyesters, in particular polyethylene terephthalates, containing pigments in such a distribution and small grain sizes as to render the polyesters suitable for the manufacture of colored structures such as foils, and especially for the manufacture of spun-dyed structures as fibers, filaments, ribbons and twists, according to the fused spinning method. Said process makes use of a centrifuged dispersion prepared from glycol, pigments and certain dispersing agents such as condensation products of aromatic hydroxy compounds or their pre-condensates with low molecular weight aliphatic aldehydes and aromatic-sulfomethane compounds, and/or condensation products from naphthalenesulfo acids and formaldehyde. These products are described in German Patents 426,424 and 292,531, for example. Such pigment-glycol dispersions containing a dispersing agent are used by mixing the dispersions into the polyester forming substances, subsequently polycondensing and moulding the melted polycondensate into filaments, fibers or foils.

Now we have found that the centrifuged pigment dispersion prepared according to the process of the patent application Serial No. 782,368 mentioned above can also be introduced into a polyester forming mass obtained by heating polyethylene terephthalate waste in the form of fibers, filaments, foils and the like with 1–10% of glycol, preferably with 2.5 to 6% glycol, to 250–300° C., preferably to 260–280° C., for 1–3 hours, and passing the depolymerized reaction product through a heated filter in order to remove impurities. The filtered mixture of reaction product and pigment dispersion can, after stirring, be polycondensed by an increase of the temperature to about 240–290° C. while simultaneously reducing the pressure to 0.1–1 mm. Hg. The melt obtained can be molded without any difficulty into fibers, filaments or foils.

A preferred manner of carrying out the process of the present invention consists in filtering the depolymerized polyester through a heated filter, for example, through a wire mesh filter or a filter candle covered with cloth, and mixing the pigment dispersion with the depolymerized polyester after filtration. The ratio of mixture of the pigment dispersion and depolymerized terephthalate is so chosen that the completely condensed polyethylene terephthalate contains 1–10%, preferably 3–6%, of pigment.

The process of the present invention is particularly suitable for the manufacture of filaments of polyethylene terephthalate pigmented with lamp black. The great advantage of the present process consists in the fact that dyed polyethylene terephthalate of high quality is obtained from practically worthless wastes. The product in view of its physical, chemical and spinning properties is very suitable for the manufacture of pigmented fibers or filaments according to fused spinning process.

The following example serves to illustrate the invention but it is not intended to limit it thereto:

*Example*

50 kilograms of polyethylene terephthalate waste in the form of filaments, foils, bristles, granulates and the like, and 2.5 kilograms of ethylene glycol are heated, while stirring, to about 278° C. After the reaction mass is completely molten, there are added to this mass within 10 minutes 35.5 kilograms of a lamp black dispersion in ethylene glycol of 6.5% strength, the dispersion having previously been centrifuged for 30 seconds, and containing 0.65% by weight, referred to glycol, of a dispersing agent consisting of a condensation product from m-cresol and the sodium salt of the 2-naphthol-6-sulfo acid, formaldehyde and sodium sulfite. The whole is then stirred for a short time, and then pressed through a heated, fine wire mesh filter by means of nitrogen into the polymerization boiler. The glycol in excess is distilled off at first at normal atmospheric pressure and at 287° C. The whole is then kept under reduced pressure for 2½ hours at the same temperature, and then heated for 4–5 hours at about 278° C. under vacuum. The resulting melt is molded to filaments. The filaments are then stretched while either cold or hot.

The quantity of condensation product used as dispersing agent can be reduced to 0.1 percent by weight, referred to the glycol, without substantial impairment of its effectiveness.

Depending on the dispersing agent used and on the nature and consistency of the lamp black or of the pigment employed, the amount of dispersing agent to be added to the glycol varies between 0.05 and 5% by weight. In general, quantities of between 0.05 and 0.7% by weight are sufficient.

Instead of 0.65% by weight of the heretofore mentioned condensation product of meta-cresol and the sodium salt of 2-naphthol-6-sulfo acid, formaldehyde and sodium sulfite, there can also be used with practically the same result 5% by weight of the condensation product of β-naphthalene-sulfo acid and formaldehyde, referred to the ethylene glycol. For the solution of the polyethylene-terephthalate waste a quantity of 1.5 kilograms of ethylene glycol proved to be sufficient.

Other condensation products described in the aforementioned German Patent 426,424 and, hence, suitable as dispersing agents, are mentioned below. According to Example 1 of said patent, 120 parts by weight of the sodium salt of 1-(ω-sulfomethyl)-2-hydroxy-6-sulfonic acid are reacted with 36 parts of the resinous condensation product of phenol and formaldehyde by heating in 300 parts of water containing 38 parts of NaOH for 6 hours at temperatures above 100° C. (about 120°–150° C.) to give a water soluble product.

According to Example 2 of the patent, a condensation product of sodium p-phenol sulfonate and the sodium salt of 1-hydroxy-benzene-2-(ω-methyl sulfonic acid) is prepared in analogous fashion.

Examples 3–7 of the patent describe the preparation of condensation products of the following materials, respectively:

Example 3, the sodium salt of 1-(ω-sulfomethyl)-2-hydroxy-naphthalene-3-carbonic acid, cresol, and paraldehyde;

Example 4, the sodium salt of 2-hydroxy-naphthalene-1-(ω-methylsulfonic acid) with m-cresol and formaldehyde;

Example 5, the sodium salt of 1-(ω-sulfomethyl)-2-hydroxy-naphthalene-6-sulfonic acid with p,p'-dihydroxy-diphenyl sulfone;

Example 6, the sodium salt of ω-sulfomethyl-anthranilic acid, cresol, and acetaldehyde or paraldehyde;

Example 7, the sodium salt of the ω-sulfomethyl compound obtained by treating the sodium salt of 1-aminonaphthalene-4-sulfonic acid with sodium bisulfite and formaldehyde, with phenol and acetaldehyde.

We claim:

1. A process for the preparation of pigmented polyethylene glycol terephthalate which comprises first preparing a reaction mass by heating to 260°–280° C. polyethylene glycol terephthalate waste with 1 to 10 percent by weight of ethylene glycol, filtering said mass at this temperature to remove impurities, admixing with the filtered mass a dispersion of a pigment in ethylene glycol, and then polycondensing the resultant mixture by heating to a temperature in the range of 240°–250° C. at a pressure of 0.1 to 1 mm. of mercury, whereby a pigmented polyethylene glycol is produced; said dispersion being admixed in such amount that 1 to 10 percent by weight of pigment is present in the pigmented polyethylene glycol terephthalate, said dispersion being prepared by admixing with said pigment ethylene glycol 0.05 to 5 percent by weight, referred to the ethylene glycol, of a dispersing agent obtained by heating in an aqueous medium containing an alkali metal hydroxide a compound of the formula

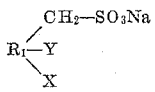

wherein X is a member selected from the group consisting of —NH$_2$, and —OH, Y is a member selected from the group consisting of —H, —SO$_3$Na, and —COONa, and R$_1$ is a member selected from the group consisting of benzene and naphthalene, with a condensation product of a compound of the formula

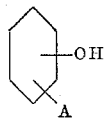

wherein A is a member selected from the group consisting of —H, —CH$_3$, SO$_3$Na, and

with a low molecular aliphatic aldehyde, and then separating from said dispersion particles of said pigment exceeding a size of 3μ.

2. The process as claimed in claim 1, wherein said pigment particles exceeding 3μ are separated by centrifugation.

3. The process as claimed in claim 1, wherein said pigment particles exceeding 3μ are separated by centrifugation and filtration.

4. The process as claimed in claim 1 wherein said pigment is lamp-black.

5. A process for the preparation of pigmented polyethylene glycol terephthalate which comprises first preparing a reaction mass by heating to 260°–280° C. polyethylene glycol terephthalate waste with 1 to 10 percent by weight of ethylene glycol, filtering said mass at this temperature to remove impurities, admixing with the filtered mass a dispersion of a pigment in ethylene glycol, and then polycondensing the resultant mixture under a pressure of 0.1 to 1 mm. of mercury, whereby a pigmented polyethylene glycol terephthalate is produced; said dispersion being admixed in such amount that 1 to 10 percent by weight of pigment is present in the pigmented polyethylene glycol terephthalate, said dispersion being prepared by admixing with said pigment and ethylene glycol 0.5 to 5 percent by weight, referred to the ethylene glycol, of a dispersing agent obtained by heating in an aqueous medium containing an alkali metal hydroxide the compound of the formula

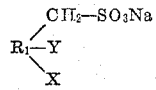

wherein X is a member selected from the group consisting of —NH$_2$ and —OH, Y is a radical selected from the group consisting of —H, —SO$_3$Na, and —COONa, and R$_1$ is a member selected from the group consisting of benzene and naphthalene, with a compound of the formula

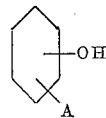

wherein A is a member selected from the group consisting of —H, —CH$_3$, —SO$_3$Na, and

and then separating particles of said pigment exceeding a size of 3μ.

6. The process as claimed in claim 5, wherein said pigment particles exceeding 3μ are separated by centrifugation.

7. The process as claimed in claim 5, wherein said pigment particles exceeding 3μ are separated by centrifugation and filtration.

8. The process as claimed in claim 5, wherein said pigment is lamp-black.

9. A process for the preparation of pigmented polytheylene glycol terephthalate which comprises first preparing a reaction mass by heating to 260°–280° C. polyethylene glycol terephthalate waste with 1 to 10 percent by weight of ethylene glycol, filtering said mass at this temperature to remove impurities, admixing with the filtered mass a dispersion of a pigment in ethylene glycol, and then polycondensing the resultant mixture by heating to a temperature in the range of 240°–250° C. at a pressure of 0.1 to 1 mm. of mercury, whereby a pigmented polyethylene glycol terephthalate is produced; said dispersion being admixed in such an amount that 1 to 10 percent by weight of pigment is present in the pigmented polyethylene glycol terephthalate, said dispersion being prepared by admixing with said pigment and ethylene glycol 0.05 to 5 percent by weight, referred to the ethylene glycol, of a dispersing agent obtained by heating in an aqueous medium containing an alkali metal hydroxide a compound of the formula

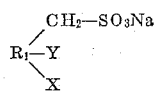

wherein X is a member selected from the group consisting of —NH$_2$ and —OH, Y is a member selected from the group consisting of —H, —SO$_3$Na, and —COONa, and R$_1$ is a member selected from the group consisting of benzene and naphthalene, with a compound of the formula

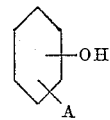

wherein A is —H, —CH$_3$, —SO$_3$Na, and

and further reacting by heating with formaldehyde and sodium sulfite, and then separating from said dispersion particles of said pigment exceeding a size of 3μ.

10. The process as claimed in claim 9, wherein said pigment particles exceeding 3μ are separated by centrifugation.

11. The process as claimed in claim 9, wherein said pigment particles exceeding 3μ are separated by centrifugation and filtration.

12. The process as claimed in claim 9, wherein said pigment is lamp-black.

13. A process for the preparation of pigmented polyethylene glycol terephthalate which comprises first preparing a reaction mass by heating to 260°–280° C. polyethylene glycol terephthalate waste with 1 to 10 percent by weight of ethylene glycol, filtering said mass at this temperature to remove impurities, admixing with the filtered mass a dispersion of a pigment in ethylene glycol, and then polycondensing the resultant mixture by heating to a temperature in the range of 240°–250° C. at a pressure of 0.1 to 1 mm. of mercury, whereby a pigmented polyethylene glycol terephthalate is produced; said dispersion being admixed in such amount that 1 to 10 percent by weight of pigment is present in the pigmented polyethylene glycol terephthalate, said pigment dispersion being prepared by admixing with said pigment and ethylene glycol 0.05 to 5 percent by weight, referred to the ethylene glycol, of a dispersing agent obtained by heating naphthalene sulfo acid with formaldehyde in an aqueous medium, and then separating particles of said pigment exceeding a size of $3\mu$.

14. The process as claimed in claim 13, wherein said pigment particles exceeding $3\mu$ are separated by centrifugation.

15. The process as claimed in claim 13, wherein said pigment particles exceeding $3\mu$ are separated by centrifugation and filtration.

16. The process as claimed in claim 13 wherein said pigment is lamp-black.

References Cited in the file of this patent

UNITED STATES PATENTS

| | | |
|---|---|---|
| 2,571,319 | Waters et al. | Oct. 16, 1951 |
| 2,637,711 | Auer | May 5, 1953 |
| 2,717,214 | Marotta et al. | Sept. 6, 1955 |
| 2,857,346 | Mauthe et al. | Oct. 21, 1958 |

FOREIGN PATENTS

| | | |
|---|---|---|
| 610,137 | Great Britain | Oct. 12, 1948 |

OTHER REFERENCES

Schildknecht: "Polymer Processes," Interscience Publishers, New York, February 28, 1956, page 866.